United States Patent
Hartmann (10) Patent No.: US 11,999,189 B2
(45) Date of Patent: Jun. 4, 2024

(54) BRAKE DISC ARRANGEMENT

(71) Applicant: SAF-HOLLAND GmbH, Bessenbach (DE)

(72) Inventor: Mark Hartmann, Heigenbrücken (DE)

(73) Assignee: SAF-HOLLAND GmbH, Bessenbach (DE)

( * ) Notice: Subject to any disclaimer, the term of this patent is extended or adjusted under 35 U.S.C. 154(b) by 603 days.

(21) Appl. No.: 17/291,877

(22) PCT Filed: Dec. 2, 2019

(86) PCT No.: PCT/EP2019/083225
§ 371 (c)(1),
(2) Date: May 6, 2021

(87) PCT Pub. No.: WO2020/114931
PCT Pub. Date: Jun. 11, 2020

(65) Prior Publication Data
US 2022/0001693 A1    Jan. 6, 2022

(30) Foreign Application Priority Data

Dec. 5, 2018  (DE) ............... 10 2018 131 016.1
May 6, 2019   (DE) ............... 20 2019 102 518.2

(51) Int. Cl.
*F16D 65/12*     (2006.01)
*B60B 27/00*     (2006.01)
*F16D 65/02*     (2006.01)

(52) U.S. Cl.
CPC ........ *B60B 27/0052* (2013.01); *F16D 65/123* (2013.01); *F16D 2065/1316* (2013.01);
(Continued)

(58) Field of Classification Search
CPC ....... B60B 27/0052; F16D 65/123–128; F16D 2065/1316; F16D 2065/1328;
(Continued)

(56) References Cited

U.S. PATENT DOCUMENTS 8,037,980 B2    10/2011  Pahle
8,287,052 B2 *  10/2012  Fakhoury ............ B60B 27/0057
                                                        301/105.1
(Continued)

FOREIGN PATENT DOCUMENTS

CA      2427940 A1    5/2001
CN    101815883 B     8/2010
(Continued)

OTHER PUBLICATIONS

European Patent Office; International Search Report; dated Feb. 24, 2020; entire document.

*Primary Examiner* — Christopher P Schwartz
(74) *Attorney, Agent, or Firm* — Price Heneveld LLP (57) ABSTRACT

A hub configured to rotate about an axis of rotation in the circumferential direction, and having a connection surface and a connection opening, the connection opening configured to at least partially receive a connector, the connection surface configured to contact indirectly and/or directly with a contact surface of a brake disc, where the contact surface does not include connection openings.

33 Claims, 5 Drawing Sheets

(52) U.S. Cl.
CPC ............... *F16D 2065/1328* (2013.01); *F16D 2065/136* (2013.01); *F16D 2065/1376* (2013.01); *F16D 2065/1384* (2013.01); *F16D 2065/1392* (2013.01)

(58) Field of Classification Search
CPC ....... F16D 2065/136; F16D 2065/1376; F16D 2065/1384; F16D 2065/1392
USPC ................. 188/17, 18 A, 218 XL; 301/105.1
See application file for complete search history.

(56) References Cited

U.S. PATENT DOCUMENTS

| | | | |
|---|---|---|---|
| 11,590,796 B2 * | 2/2023 | Wallmeier | .......... B60B 27/0052 |
| 2004/0050632 A1 | 3/2004 | Gotti et al. | |
| 2004/0207249 A1 | 10/2004 | Baumgartner et al. | |
| 2016/0280006 A1 | 9/2016 | Pahle | |
| 2017/0122391 A1 * | 5/2017 | Pahle | .................... F16D 65/123 |
| 2021/0078363 A1 * | 3/2021 | Biewer | .................. B60B 27/02 |

FOREIGN PATENT DOCUMENTS

| | | |
|---|---|---|
| CN | 102099596 A | 6/2011 |
| CN | 102853006 A | 1/2013 |
| CN | 203114965 U | 8/2013 |
| CN | 105065515 A | 11/2015 |
| CN | 106460977 B | 2/2017 |
| CN | 108105291 A | 6/2018 |
| DE | 19522677 C1 | 1/1997 |
| DE | 19628331 A1 | 1/1998 |
| DE | 10133985 A1 | 10/2002 |
| DE | 10246939 A1 | 5/2004 |
| DE | 102011115351 A1 | 4/2013 |
| DE | 102013001764 A1 | 7/2014 |
| DE | 102014107228 A1 | 11/2015 |
| EP | 0127932 A1 | 12/1984 |
| EP | 2543905 A1 | 1/2013 |
| JP | 2008296621 A | 12/2008 |
| KR | 20180105808 A | 10/2018 |
| WO | WO-2009146722 A1 * 12/2009 ............. B60B 27/02 |

* cited by examiner

Fig. 5

BRAKE DISC ARRANGEMENT

BACKGROUND OF THE INVENTION

The invention relates to a hub, a brake disc arrangement, in particular for commercial vehicles, as well as a brake disc and a hub for such a brake disc arrangement.

Brake disc assemblies are already known from the prior art, these serve to brake a wheel connected to the brake disc. Prior art brake disc assemblies, in particular of commercial vehicles, are either designed in such a way that they have a particularly long hub body or a particularly long brake disc connection. These prior art brake disc arrangements, in particular of commercial vehicles, therefore have the disadvantage that they are extremely heavy and require a lot of installation space.

It is therefore an object of the present invention to provide a brake disc arrangement which is particularly space-saving and lightweight.

SUMMARY OF THE INVENTION

The invention relates to a hub, in particular a commercial vehicle wheel hub, wherein the hub is adapted to rotate about an axis of rotation in the circumferential direction, wherein the hub has a connection surface and a connection opening, wherein the connection opening is adapted to at least partially receive a connection means, wherein the connection surface is adapted to contact indirectly and/or directly with a contact surface of a brake disc, wherein the connection surface is designed without connection openings. The hub serves in particular to be rotatably mounted about a shaft or axle. The hub according to the invention can in particular be a wheel hub or, particularly preferably, a commercial vehicle wheel hub. In this context, a commercial vehicle wheel hub means in particular a hub which is or can be arranged on a commercial vehicle in such a way and is capable of absorbing the wheel loads occurring on a commercial vehicle. A commercial vehicle in the sense of the invention is in particular a road-bound vehicle which has a total weight of more than 3.5 t, preferably of more than 7.5 t and more preferably of more than 15 t. Advantageously, the commercial vehicle is in particular suitable for transporting, for example, persons or goods and/or for towing trailers or may itself be a trailer. In other words, a commercial vehicle wheel hub is designed to be significantly more stable than a normal wheel hub. The wheel hub according to the invention is adapted to rotate about an axis of rotation in the circumferential direction, this axis of rotation being in particular the axis of rotation of the shaft and/or the axle and/or the wheel which is to be supported by the hub or on which the hub is or is to be supported. The hub has a connection surface, the connection surface being adapted to make contact indirectly and/or directly with a contact surface of a brake disc. In addition, the hub also has a connection opening, this connection opening being adapted to be able to receive at least one connection means. A connection means in the sense of the invention can be, for example, a screw, a bolt or a rivet. By means of the connection opening and by means of the connection surface, a type of clamping system is provided in order to be able to fix or mount a brake disc on the hub according to the invention. According to the invention, the connection surface is formed without a connection opening. This means that the connection opening does not extend from a connection surface and/or is at least partially not delimited by the connection surface. By forming the connection surface without connection openings, it can be achieved that the connection surface itself or its outer dimensions can be made particularly small, so that a particularly compact hub results. In addition, this connection-opening-free design of the connection surface can also serve to ensure that the connection surface has a relatively homogeneous surface pressure—in a state in which the brake disc is mounted. The hub according to the invention can also have the features listed below, in particular the features of the described hub of the brake disc arrangement, without the presence of a brake disc being necessary.

Expediently, the connection surface, advantageously all connection surfaces, is spaced in the direction of the axis of rotation and/or in the radial direction from the surface or surfaces surrounding and/or having the connection opening. The surface closest to the connection surface in the direction of the axis of rotation, which surrounds and/or has the connection opening, is decisive in each case. In other words, the connection surface can be offset in the direction of the axis of rotation and/or in the radial direction from the closest surface(s) surrounding and/or having the connection opening(s). In this way, a clamping system can be realised in a particularly simple and space-saving manner, which can achieve large clamping lengths due to the spacing and thus offers favourable assembly conditions, in particular in the case of a dynamic load.

Advantageously, the connection surfaces are designed in such a way that the normals of these connection surfaces are essentially parallel to the axis of rotation. This makes it possible to achieve a particularly space-saving hub in the direction of the axis of rotation. By essentially parallel to the axis of rotation is to be understood that the normal of the connection surface forms an angle of at most 5°, preferably at most 4°, more preferably at most 1.5° and most preferably at most 1° with the axis of rotation.

Advantageously, the hub is designed in one piece. The one-piece design of the hub enables a particularly space-saving and mechanically resilient hub. For example, such a one-piece design can be achieved by casting the hub in one piece. In addition, the hub can also be designed as a one-piece forged part. The advantage of one-piece forgings is that they have particularly advantageous mechanical properties.

Advantageously, the hub comprises a core portion, a cantilever portion and a brake disc connection portion, wherein the cantilever portion and the brake disc connection portion extend radially in a radial direction from the core portion, wherein the cantilever portion comprises a wheel contact surface and at least one connection opening, preferably all connection openings, wherein the brake disc connection portion comprises at least one contact surface, preferably all contact surfaces. The radial direction is the direction extending radially away from the axis of rotation. By dividing the hub into the different portions, in particular the cantilever portion, core portion and brake disc connection portion, it can be achieved that these portions can be explicitly designed to be functionally suitable. In addition, this type of design also means that unnecessary parts can be saved, resulting in a particularly weight- and space-saving hub. The cantilever portion and the brake disc connection portion can in particular form diametrically opposite portions of the wheel hub along the axis of rotation. The brake disc connection portion can, for example, be formed by small rib elements, which do not necessarily have to be contiguous. In other words, this can mean that the brake disc connection portion is formed by several small elements which are connected to each other, for example, only via the core portion. The core portion of the hub serves in particular to create a mechanical connection between the cantilever portion and the brake disc connection portion. The core portion preferably forms at least those parts of the hub that are closest to the axis of rotation. In other words, this can mean that in particular the parts of the hub facing the axis of rotation, in particular exclusively, are formed by the core portion. The cantilever portion of the hub has in particular a wheel contact surface. This wheel contact surface serves to contact, in particular directly or indirectly, a wheel in a mounted state. In other words, the wheel contact surface or the wheel contact surfaces of the cantilever portion can serve to enable a mechanical connection with a wheel. In addition, the cantilever portion in particular comprises at least one connection opening, preferably all connection openings. This design of the connection openings in the cantilever portion advantageously allows a particularly long clamping length of the connection means for connecting the brake disc to be achieved. This long clamping length has strong advantages, particularly with regard to dynamic loads, because it allows a large diameter of the fastener to be used, as is required in particular for commercial vehicle arrangements, while at the same time the spring stiffness of the fastener can be reduced due to the long length.

In order to achieve an advantageous clamping length, the minimum distance of the connection openings to the contact surface or to the next distanced contact surface is at least 3 cm, preferably at least 10 cm and more preferably at least 15 cm in the direction of the axis of rotation.

In an advantageous embodiment, the core portion forms an intermediate portion which lies in the direction of the axis of rotation between the cantilever portion and the brake disc connection portion, wherein the intermediate portion is formed in particular without ribs. By without ribs it can be understood that at least in the intermediate portion no reinforcing ribs are provided. For example, the intermediate portion can be smooth. Smooth means in particular that the inner and/or outer contour of the hub area is circular, square or elliptical in a section plane whose normal is parallel to the axis of rotation. By forming the intermediate portion without ribs, it can be designed with a particularly low notch effect, so that it can nevertheless be subjected to heavy loads with a lower material requirement. The brake disc connection portion or the cantilever portion, however, can have ribs or rib elements for reinforcement. The intermediate portion of the core portion is preferably arranged between the cantilever portion and the brake disc connection portion in such a way that it creates in particular exclusively the mechanical connection between the cantilever portion and the brake disc connection portion.

In a preferred embodiment, the intermediate portion has a tapered outer geometry compared to the cantilever portion and/or compared to the brake disc connection portion. Surprisingly, the applicant has found that the intermediate portion can be significantly smaller in dimension than the intermediate portion or the cantilever portion. Therefore, weight and installation space can be saved by the tapered outer geometry. A tapered outer geometry compared to the cantilever portion and/or to the brake disc connection portion exists in particular if the outer geometry of the intermediate portion has a smaller distance to the axis of rotation than the nearest parts of the cantilever portion and/or of the brake disc connection portion in the direction of the axis of rotation.

Advantageously, the cantilever portion has a larger maximum distance from the axis of rotation in the direction of the radial direction than the brake disc connection portion. The small dimension of the brake disc connection portion in the direction of the radial direction results in a hub that saves installation space. Advantageously, the ratio of the maximum extension of the brake disc connection section (or sections) in the direction of the radial direction to the maximum extension of the cantilever portion in the direction of the radial direction is in a range of 0.4 to 0.6. This makes it possible to achieve a particularly space-saving hub.

Advantageously, the hub, in particular in the intermediate portion, is formed in at least one cutting plane whose normal is parallel to the axis of rotation in such a way that the cross-section has a circular outer contour around the axis of rotation. By forming a circular outer contour of this cross-section, a particularly torsionally loadable cross-sectional shape can be achieved. It is particularly preferred if not only the outer contour in this cross-section is circular, but also the inner contour, because in particular a circular ring cross-section resulting from this has a particularly high torsional load-bearing capacity.

Advantageously, the hub has ribs which preferably run in the direction of the radial direction and/or in the direction of the axis of rotation, wherein at least one connection surface forms part of a respective rib, wherein these ribs preferably extend only into the brake disc connection portion and/or form the brake disc connection portion. In this context, ribs are to be understood in particular as projections which extend in the radial direction and/or in the direction of the axis of rotation. The formation of ribs results in a particularly light hub, because ribs require a particularly small amount of material compared to a complete formation, resulting in a particularly light hub. Advantageously, the ribs are designed in such a way that they each form or have at least one connection surface. This type of design allows the connection surface to be formed in a particularly compact manner. For example, the brake disc connection portion can be formed only by individual rib elements formed in the circumferential direction around the core portion, which are, however, expediently not contiguous with one another. Advantageously, a fastening means extends between each of these ribs, wherein this fastening means is oriented essentially parallel to the axis of rotation. This type of design of the brake disc connection portion can therefore achieve a particularly compact brake disc connection portion or hub, because the fastening means can be arranged particularly close to the axis of rotation due to the rib-like design of the individual "sub-brake disc connection portions".

Preferably, the hub has, in particular in the cantilever portion, a wheel bolt receptacle, preferably a plurality of wheel bolt receptacles. The provision of wheel bolt receptacles makes it particularly easy to mount a wheel on the hub. Advantageously, this wheel bolt receptacle and/or a possible existing wheel contact surface in the cantilever portion is arranged further away from the axis of rotation than the connection opening, preferably all connection openings, in the cantilever portion. These further radially outwardly arranged wheel bolt receptacles and/or wheel contact surface(s) result in a particularly space-saving hub. Advantageously, at least one connection opening, preferably all connection openings, completely penetrates the hub, in particular the cantilever portion. This complete penetration of the connection opening makes it easier to reach the connection means—which is present in an assembled state—so that the brake disc can be assembled more easily. It is particularly preferred if the connection openings completely penetrate the hub, in particular the cantilever portion, and at the same time are arranged radially further inwards than the wheel mounting surface or the wheel mounting surfaces as well as the wheel bolt receptacles. This ensures that the connection openings are accessible even when a wheel is attached to the wheel hub, so that the brake disc can also be removed during operation, for example.

Advantageously, the hub has air ducts which extend in particular in the direction of the axis of rotation. By providing these air ducts, the cooling effect of a brake disc located behind the hub can be increased and, in addition, this also results in a weight reduction. Advantageously, these air ducts are arranged in such a way that they alternate with the ribs of the hub. In other words, this can mean that one such air duct is provided between each two ribs as seen in the circumferential direction. The air duct can completely penetrate a part of the hub preferably in the direction of the axis of rotation, so that a cooling flow entering from the outside can reach the brake disc through the air ducts.

It is advisable for the hub to have at least one bearing contact surface, preferably at least two bearing contact surfaces. The possibility of arranging at least one or two wheel bearings on the hub results in a particularly compact wheel hub. The bearing contact surfaces are in particular those surfaces which contact(s) the wheel bearing and/or the bearing indirectly and/or directly in an assembled state. Particularly preferably, the bearing contact surface(s) form a radial inner boundary of the core portion.

Advantageously, the hub has at least one centring projection, wherein the centring projection delimits a connection surface in the direction of the radial direction. The centring projection is a projection that can, for example, be designed to engage in a complementary recess in a brake disc. This complementary design of the centring projection with the brake disc recess can in particular facilitate the assembly of the brake disc. By forming the centring projection in such a way that it delimits a connection surface in the radial direction, a type of toothing with a brake disc can additionally be achieved. By arranging it radially further outwards, a type of "emergency toothing" can therefore also be provided in particular, by means of which even high torques can be transmitted safely. It is particularly preferred if each connection surface is limited in the direction of the radial direction, in particular outwards, by such a centring projection. In this way, a particularly resilient emergency braking device or emergency torque transmission can be realised. In this respect, however, it should be pointed out that the projections or centring projections are only intended to serve as emergency torque transmission, so that, in particular in an assembled state, a certain amount of play should be provided in the circumferential direction with respect to the complementarily formed recesses or positive-locking transmission means of the brake disc.

Advantageously, the hub has a plurality of connection surfaces, wherein preferably each of the connection surfaces is bounded in the direction of the radial direction by a centring projection. This plurality of connection surfaces, which are in particular each bounded by a centring projection in the radial direction, in particular on the outwardly, results in a particularly safe torque transmission even with high torques and/or highly dynamic torques.

According to the invention, a brake disc arrangement comprises a brake disc, a hub, in particular a previously described hub, and at least one connection means, wherein the brake disc arrangement is adapted to rotate about an axis of rotation in the circumferential direction, wherein the brake disc has a contact surface and a mounting surface, wherein the hub has a connection surface and a connection opening, wherein a mounting aperture extends from the mounting surface, wherein the contact surface is adapted to contact indirectly and/or directly with the connection surface of the hub, wherein the connection means is adapted to extend at least partially in the mounting opening and the connection opening, wherein the mounting surface is free of hub contact. The brake disc arrangement according to the invention is used to brake a shaft, an axle, and/or a wheel. This braking takes place in particular in such a way that a dissipative braking torque is generated by a frictional contact of brake linings with the friction surfaces of the brake disc, which is transmitted from the brake disc to the hub, and from there indirectly and/or directly to the wheels, the shaft or the axle to be braked. This rotational movement of the shaft and/or axle to be braked takes place in particular in the circumferential direction about the axis of rotation about which the brake disc arrangement can rotate. In other words, the axis of rotation can therefore be the axis about which the shaft, the axle and/or the wheel which is to be braked by means of the brake disc arrangement can rotate. The brake disc of the brake disc arrangement according to the invention has at least one contact surface and one mounting surface. In particular, the contact surface is designed to contact the connection surface of the hub indirectly and/or directly. Advantageously, the at least one contact surface and the one connection surface are designed to form a type of clamping system between the hub and the brake disc. In particular, the contact surface is arranged on the brake disc in such a way that it is arranged on the side of the brake disc, in particular the distal side, in particular as viewed in the direction of the axis of rotation, which faces the hub, in particular the centre of gravity thereof, and/or is arranged on the side of the brake disc, in particular as viewed in the direction of the axis of rotation, on which the contact surface is also located. The hub of the brake disc arrangement has at least one connection surface which, as already explained, is designed to make contact indirectly and/or directly with the contact surface. Advantageously, the brake disc hub arrangement has not only a contact surface and a connection surface, but a plurality of pairs of connection and contact surfaces. The connection opening of the hub serves to receive a connection means of the brake disc arrangement, the connection means extending at least partially in both the connection opening and the mounting opening. For example, the connection means may be a screw, in particular a fitting screw, a bolt or a rivet. The mounting opening in which the connection means extends at least partially is formed in such a way that it extends from the at least one mounting surface of the brake disc. In other words, this can mean that the mounting opening can be introduced into a mounting surface. Particularly preferably, the mounting surface is designed in such a way that it completely encloses the mounting opening. Advantageously, the brake disc has a plurality of mounting surfaces, because this enables the hub to be secured to the brake disc in a particularly secure manner. At least one, preferably the majority, and particularly preferably all of the mounting surfaces are designed to be free of hub contact. By hub-contact-free in this context it is to be understood that in a mounted state the mounting surface does not contact the hub indirectly and/or directly, in particular a free area is provided between the mounting surface and the hub, advantageously seen in the direction of the axis of rotation and/or in the direction of extension of the connection means, in order to prevent such contact. The design of the brake disc arrangement according to the invention makes it possible to achieve a particularly space-saving and lightweight brake disc arrangement.

Advantageously, the brake disc has projections projecting in the direction of the axis of rotation and/or in a radial direction, wherein at least one mounting surface forms a part of a projection, wherein the mounting surface forms in particular an edging end face for the projection in the direction of the axis of rotation. The end face of the projections is in particular the end face of the projections which edges the projections in the direction of the hub. By providing projections which are partially formed by the mounting surface, a particularly secure mounting of the connection means can be effected and/or a particularly secure introduction of force from the connection means into the brake disc can be achieved. Advantageously, the projections project from the brake disc in the radial direction and/or in the direction of the axis of rotation in the direction of the hub. In this way, a particularly compact brake disc can be achieved, among other things.

In an advantageous embodiment, the projections are engageable with a complementary toothing of the hub. These toothings of the hub can have polygonal and/or cuboid cross-sections, in particular perpendicular to the direction in which the teeth extend. Advantageously, the teeth project in the radial direction and/or in the direction of the axis of rotation (tooth extension direction). In this way, a particularly simple production of the individual teeth can be achieved. Alternatively or additionally preferred, the toothing can also be formed by teeth with a rounded cross-section, as this can reduce the notch effect that occurs, so that a particularly mechanically resilient toothing results. By engaging the projections with the complementary toothing of the hub, a particularly safe torque transmission can be achieved, especially in the case of emergency braking.

Advantageously, the brake disc and the hub are connected or can be connected to each other in terms of torque via a polygonal connection. In this way, a particularly safe torque transmission can be reliably transmitted, in particular even with strongly changing torques. Advantageously, the polygonal connection is designed in such a way that the complementary contours required for this on the brake disc and the hub, in particular viewed in the direction of the axis of rotation, have a polygon, a square, an equal thickness, a flower shape and/or a cloverleaf shape, because the applicant has found that this type of design of the contours of the polygonal connection can be produced particularly easily, in particular by means of a master moulding process, and/or offer a particularly high degree of safety for dynamic torque transmission.

In an advantageous further development, the projections of the brake disc to the toothing of the hub and/or the polygon connection between brake disc and hub have a play in the circumferential direction, in particular between 0.1 mm and 2 mm. This can simplify the assembly of the brake disc arrangement, because the play in the circumferential direction allows the brake disc to be easily joined to the hub, so that valuable assembly time can be saved.

Advantageously, the hub has ribs which preferably run in the direction of the radial direction and/or in the direction of the axis of rotation, at least one connection surface forming part of a rib. Preferably, at least one rib, but in particular the majority and particularly preferably all ribs, is designed in such a way that in each case a connection surface forms a bordering top surface or end surface of in each case one rib in the direction of the axis of rotation. In other words, this can mean that each rib, in particular at its one distal end, has a connection surface that makes indirect and/or direct contact with the contact surface of the brake disc. Particularly preferably, all connection surfaces are designed as cover surfaces for the ribs. This rib-like design of the hub results in a particularly mechanically resilient and light brake disc arrangement.

Advantageously, the hub has projections which extend into complementary recesses, in particular pockets, of the brake disc. This enables positive torque transmission between the hub and the brake disc, in particular in emergencies. Advantageously, a play is provided between the toothing elements (projections and recesses), in particular in the range of 0.1 mm to 2 mm, in the circumferential direction and/or in the radial direction. This can simplify the assembly of the brake disc. In addition, the projections of the brake disc can also serve and/or be designed as centring projections in order to simplify the assembly of the brake disc. It is particularly preferred, in order to achieve a high or safe torque transmission, if the projections of the hub and the complementary recesses of the brake disc are spaced further from the axis of rotation in the direction of the radial direction than the spacing of the mounting surface(s) and/or the connection surface(s), in particular the mean spacing of the mounting surfaces and/or the connection surfaces. It is particularly expedient if the projections of the brake disc extend from a rib and/or each form a distal end of a rib in the direction of the axis of rotation and/or in the direction of the radial direction. In this way, both a particularly compact and a particularly resilient brake disc arrangement can be achieved. Advantageously, the brake disc arrangement has at least 7, and preferably at least 10, pairs of projection-recesses in order to be able to ensure reliable torque transmission even in the event of impact-type loading.

Preferably, the brake disc has a plurality of contact surfaces and a plurality of mounting surfaces, wherein the contact surfaces and the mounting surfaces are arranged alternately in the circumferential direction. Alternately arranged in this context can mean that the contact surfaces and the mounting surfaces are arranged in turns, in particular as seen in the circumferential direction. In other words, this can mean that the mounting surfaces are arranged in the "gaps" between the contact surfaces. The alternating arrangement can result in a particularly mechanically loadable brake disc, because the alternating arrangement results in a particularly advantageous stress distribution in the brake disc.

Expediently, the contact surfaces and the mounting surfaces are arranged in the radial direction (or in a radial direction) in such a way that at least some of these surfaces are at the same distance from the axis of rotation. In other words, this can mean that the contact surfaces and the mounting surfaces are designed in such a way that, viewed in the direction of the axis of rotation, there is at least one circle whose projection intersects all the mounting surfaces as well as all the contact surfaces. By arranging the contact surfaces and the mounting surfaces in this way, a particularly space-saving brake disc arrangement can be achieved.

Preferably, the distance of one, advantageously all, assembly openings from the axis of rotation is greater than the mean distance of the contact surfaces from the axis of rotation. This makes assembly particularly easy, because placing the mounting opening further out increases its accessibility, so that the fastening means in particular can be inserted more easily into the assembly opening. The mean distance of the contact surfaces is in particular the averaged absolute distance of the surface elements of the contact surfaces. In other words, this can mean that the mean distance is the average absolute distance of all the contact surfaces from the axis of rotation. The distance relevant for determining the distance of the mounting openings is in particular the maximum distance of the mounting openings and/or the averaged distance of all mounting openings.

Advantageously, the ratio of the mean distance of the contact surface from the axis of rotation to the mean distance of the mounting opening from the axis of rotation is in a range of 0.6-1.5, preferably in a range of 0.8-1.2, and more preferably in a range of 0.9-1.1. A ratio of 0.6-1.5 results in a particularly space-saving brake disc arrangement. With a ratio of the mean distance of the contact surfaces from the axis of rotation to the mean distance of the mounting opening from the axis of rotation in a range of 0.8-1.2, the applicant has surprisingly found that this results in a brake disc which is particularly easy to manufacture, and thus a brake disc arrangement which is particularly easy to manufacture. With a ratio in the range of 0.9-1.1, a particularly safe torque transmission between the hub and the brake disc can be ensured.

Advantageously, at least one contact surface, preferably the majority of the contact surfaces, and particularly preferably all contact surfaces, and/or at least one connection surface, preferably the majority of the connection surfaces, and particularly preferably all connection surfaces, has a normal, in particular an averaged normal, which is essentially parallel to the extension of the connection means and/or to the axis of rotation. By "essentially parallel" it is generally to be understood that the two relevant directions may have a (smaller) angle to each other, which is at most 15°, preferably at most 7°, and particularly preferably at most 1°. This type of design of the contact surfaces and the connection surfaces in relation to the extension of the connection means and/or to the orientation of the axis of rotation makes it possible to achieve a particularly simple production of the contact surfaces and/or the connection surfaces. Alternatively or additionally, it is preferred if the connection surfaces and the contact surfaces are designed at least parallel to each other, so that a particularly simple fixing can be achieved.

Advantageously, the contact surfaces and/or the connection surfaces have a roughness (RZ) of maximum 40 μm, preferably of maximum 30 μm, and particularly strongly preferred of maximum 12 μm. This reduces the settlement phenomena that can hardly be avoided during operation.

Advantageously, at least one connection opening, preferably all connection openings, penetrates the hub completely and/or wherein at least one mounting opening, preferably all mounting openings, penetrate the brake disc completely. The complete penetration of the hub and/or the brake disc results in a particularly simple production of the hub and/or the brake disc. Alternatively or additionally preferably, the mounting opening(s) and/or the connection opening(s) can also be designed to be non-continuous, in particular as a blind hole. This can simplify assembly, in particular of the brake disc, in that the orientation of the brake disc in relation to the hub can be clearly identified through the blind holes, so that assembly errors in particular can be avoided.

Expediently, the hub has at least one bearing contact surface, preferably at least two bearing contact surfaces, for a wheel bearing. Due to the possibility of arranging at least one or two wheel bearings on the hub, the hub of the brake disc arrangement can also serve as a wheel hub, so that a particularly compact wheel bearing and brake disc arrangement is achieved. The bearing contact surfaces are in particular those surfaces by means of which the wheel bearing makes contact indirectly and/or directly in an assembled state. In this regard, it should be noted that the bearing contact surfaces do not necessarily have to be flat, rather, the bearing contact surfaces should be understood to mean that one bearing contact surface in each case serves to support a wheel bearing and/or that a wheel bearing can rest against this surface.

Preferably, the hub has a wheel bolt receptacle. By designing the hub as a wheel hub, a particularly compact axle unit or a compact axle head can be achieved, so that valuable installation space can be saved. The wheel bolt receptacle can, for example, be formed by openings through which wheel bolts can extend. Advantageously, the hub also has a centring rim and/or several centring rim segments by means of which a rim of a wheel can be centred on the hub.

Advantageously, the brake disc is bent and/or V-shaped and/or shielded in the direction of the radial direction, at least in a non-assembled state, in particular away from the wheel hub. This design of the brake disc counteracts the moment acting on the brake disc through the connection means, so that in an assembled state the brake disc is in particular no longer bent and/or V-shaped and/or shielded. In this context, the term "bent" can be understood to mean in particular that the extension of the brake disc in the radial direction is arcuate. An arcuate design of the brake disc is also known to the skilled person, for example, in the case of a temperature-related shielding of the brake disc.

Advantageously, the ratio of the maximum extension of the brake disc in the direction of the axis of rotation to a maximum extension of the hub in the direction of the axis of rotation is in the range of 0.07-0.5, preferably in the range of 0.1-0.3, and more preferably in the range of 0.15-0.25. At a ratio in the range of 0.07-0.5, the applicant has found that a brake disc arrangement which is particularly easy to assemble results. A ratio of 0.1-0.3 results in a particularly space-saving brake disc arrangement, and a ratio of 0.15-0.25 results in a particularly light brake disc arrangement.

Alternatively or additionally preferably, the ratio of the maximum extension of the brake disc in the direction of the axis of rotation to a maximum extension of a contact surface of the hub to a distal end of the hub is in a range of 0.1-0.5, preferably in a range of 0.15-0.4, and more preferably in a range of 0.2-0.3. The contact surface of the hub is in particular that surface at which the connection means, in particular its screw or rivet head, contacts the hub. The maximum extension of this contact surface to the distal end of the hub is the greater of the two extensions in the direction of the axis of rotation of the hub to its distal ends in the direction of the axis of rotation. A ratio of 0.1-0.5 results in a brake disc arrangement that is particularly easy to assemble. A ratio of 0.15-0.4 results in a particularly space-saving brake disc arrangement and a ratio of 0.2-0.3 in a particularly light brake disc arrangement.

Advantageously, the ratio of the maximum extension of the connection means to the maximum extension of the hub in the direction of the axis of rotation is in a range of 0.3-1.1, preferably in a range of 0.5-0.95, and more preferably in a range of 0.7-0.85. The maximum extension of the connection means is in particular the maximum length of the connection means. The maximum length of the connection means can expediently be the length of the connection means in the direction of the axis of rotation in an assembled state. A ratio of 0.3-1.1 results in a particularly secure fixing of the hub, because the particularly large length of the connection means can absorb dynamic loads particularly well, resulting in a secure fixing of the brake disc. A ratio of 0.5-0.95 results in a particularly space-saving brake disc arrangement. A ratio in the range of 0.7-0.85 results in a particularly secure fixing, even against static loads.

Advantageously, the brake disc is a ventilated, in particular a transversely ventilated brake disc. The design of the brake disc as a ventilated, in particular a transversely ventilated brake disc, results in a brake disc that can also meet high requirements and, in addition, weight can also be saved as a result.

Advantageously, the hub has air ducts which extend in particular in the direction of the axis of rotation. By providing these air ducts, the cooling effect of the brake disc can be increased and, in addition, this also results in a reduction of the weight of the brake disc arrangement. Advantageously, these air ducts are arranged in such a way that they alternate with the ribs of the hub. In other words, this may mean that one such air duct is provided between each two ribs as seen in the circumferential direction. The air duct can preferably completely penetrate a part of the hub in the direction of the axis of rotation, so that a cooling flow entering from the outside can reach the brake disc through the air ducts.

Another aspect of the invention relates to a brake disc for a brake disc arrangement as described above.

Another aspect of the invention relates to a hub for a brake disc arrangement as described above.

BRIEF DESCRIPTION OF THE DRAWINGS

Further advantages and features of the present invention result from the following description with reference to the figures. Individual features of the embodiments shown may also be used in other embodiments, unless this has been expressly excluded. It is shown in.

DETAILED DESCRIPTION OF THE PREFERRED EMBODIMENTS

Figure 1:
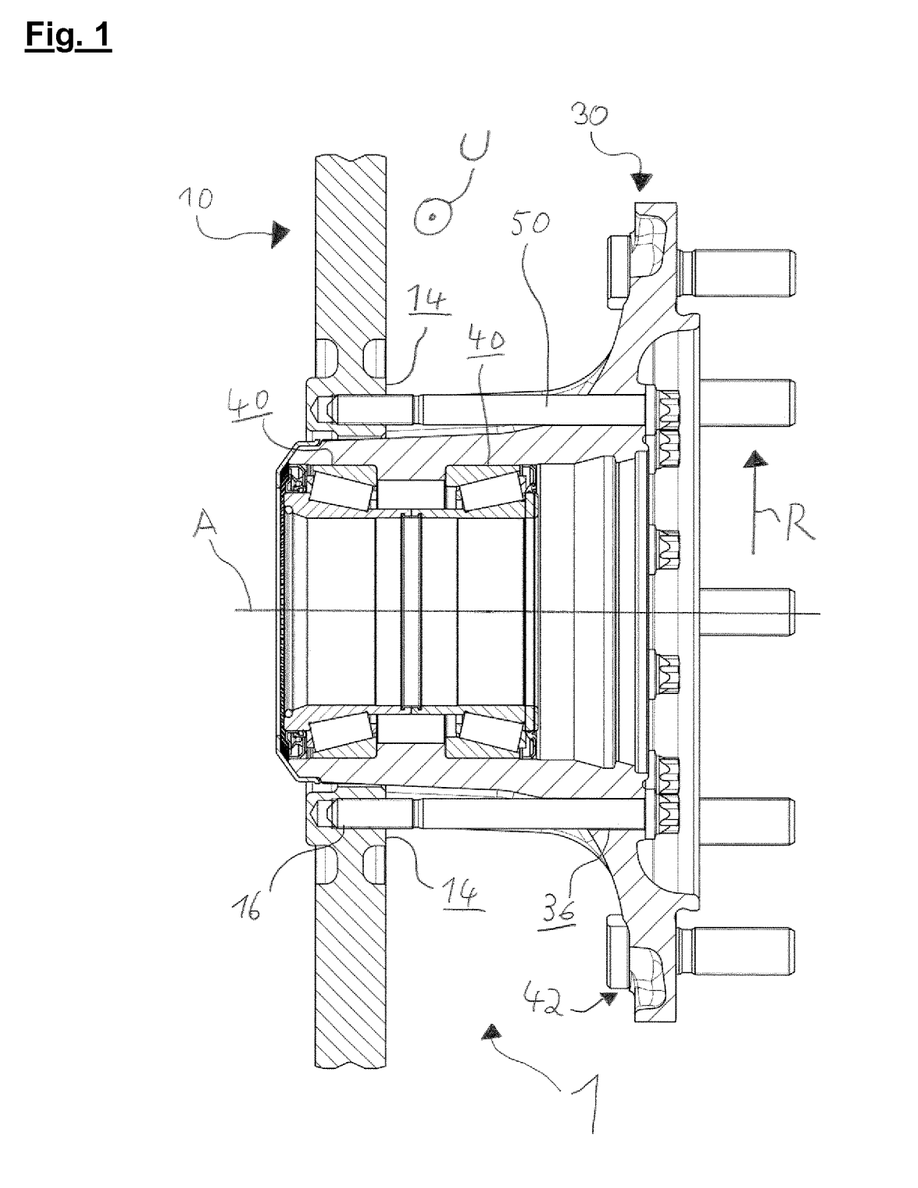
FIG. 1 is a section through a brake disc arrangement.

FIG. 1 shows a sectional view of a brake disc arrangement 1. The brake disc arrangement 1 comprises a brake disc 10, a hub 30 and a plurality of connection means 50. The brake disc arrangement 1 is designed to rotate about the axis of rotation A in a positive or negative circumferential direction U. The brake disc 10 has a plurality of contact surfaces 12 (not shown in FIG. 1) and a plurality of mounting surfaces 14. The brake disc 10 has a plurality of contact surfaces 12 (not shown in FIG. 1) and a plurality of mounting surfaces 14. In the embodiment shown, a mounting opening 16 is made in each of the mounting surfaces 14, in which a connection means 50 extends at least partially. The connection means 50, which are at least essentially parallel to the axis of rotation A, also extend through the connection openings 36 of the hub 30 and thus connect the brake disc 10 to the hub 30. The hub 30 comprises—viewed in the radial direction R—in its outer region a plurality of wheel bolt receptacles 42, each of which receives a wheel bolt. In addition, the hub 30 also has two bearing contact surfaces 40, against each of which a tapered roller bearing rests.

Figure 2:
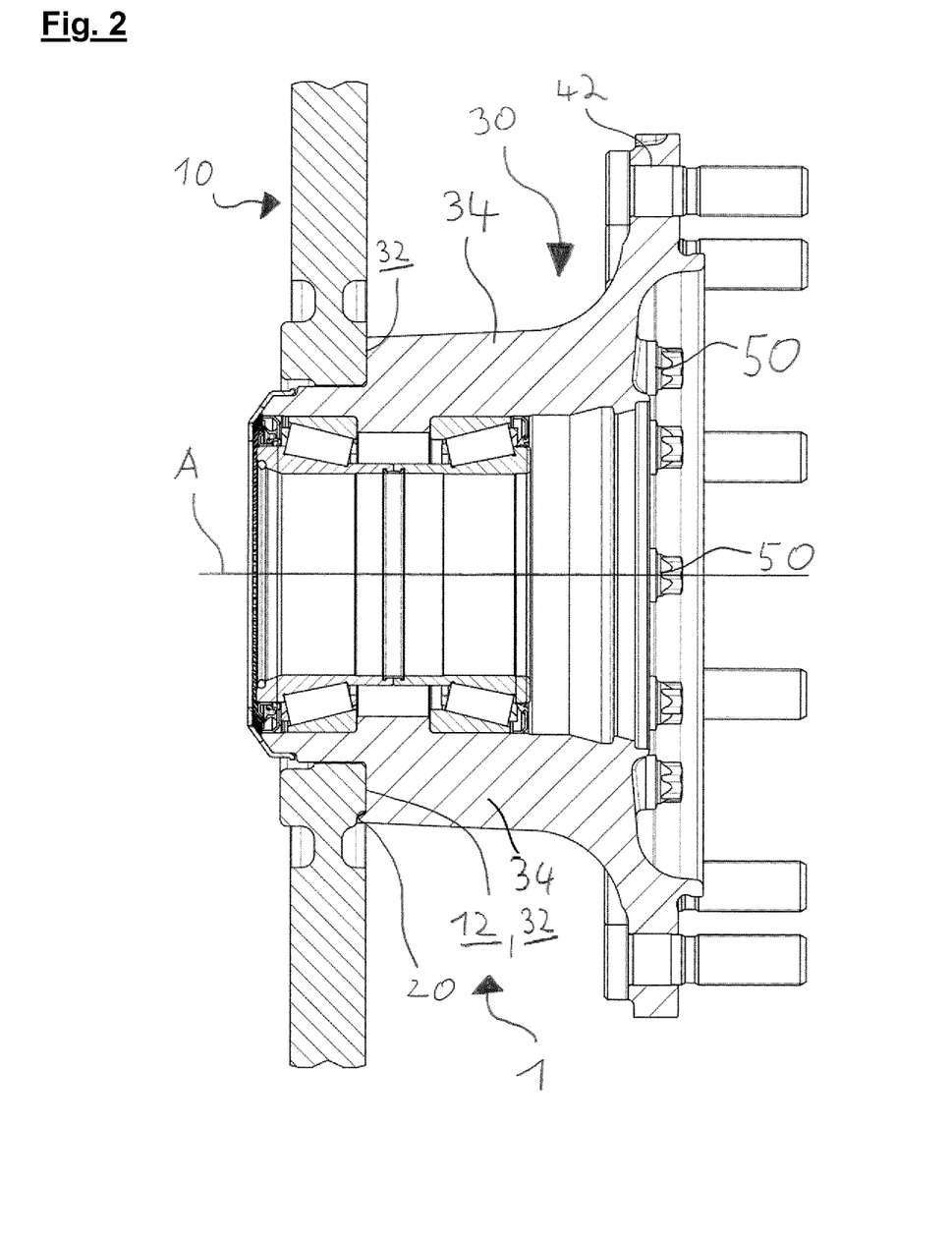
FIG. 2 is a further section through a brake disc arrangement.

FIG. 2 shows a further embodiment of a brake disc arrangement 1, wherein the section shown in FIG. 2 can match the embodiment shown in FIG. 1. However, the sectional planes in FIG. 1 and FIG. 2 are rotated relative to one another by a certain angle in the circumferential direction U. The hub 30 of the brake disc arrangement 1 shown in FIG. 2 has a plurality of ribs 34, with a connection surface 32 in each case forming a bordering top surface of the rib 34 in the direction of the axis of rotation A. The connection surfaces 32 make direct contact with the opposite contact surface 12 of the brake disc 10. In order to achieve a particularly simple mounting of the brake disc 10 on the wheel hub 30, the wheel hub 30 has a centring projection 20 which engages in a complementary centring recess of the brake disc 10.

Figure 3:
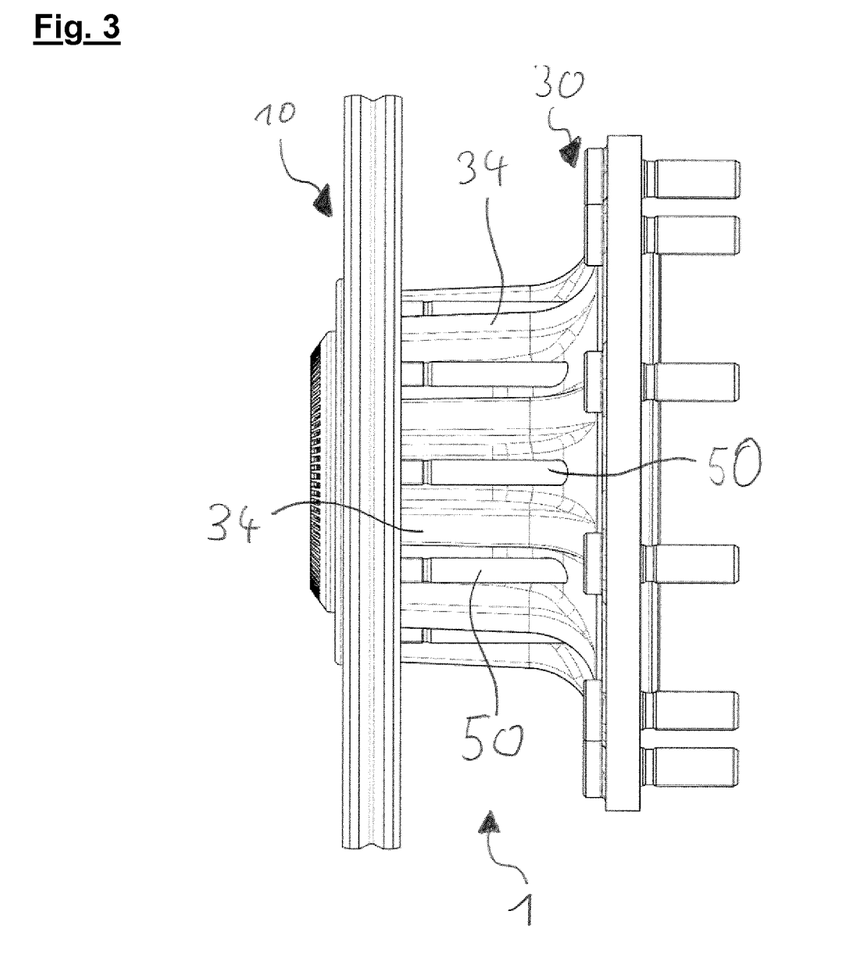
FIG. 3 is an external view of a brake disc arrangement.

FIG. 3 shows an external view of a brake disc arrangement 1. The brake disc arrangement 1 has a plurality of connection means 50, each of which extends alternately at least partially between ribs 34 of the hub 30.

Figure 4:
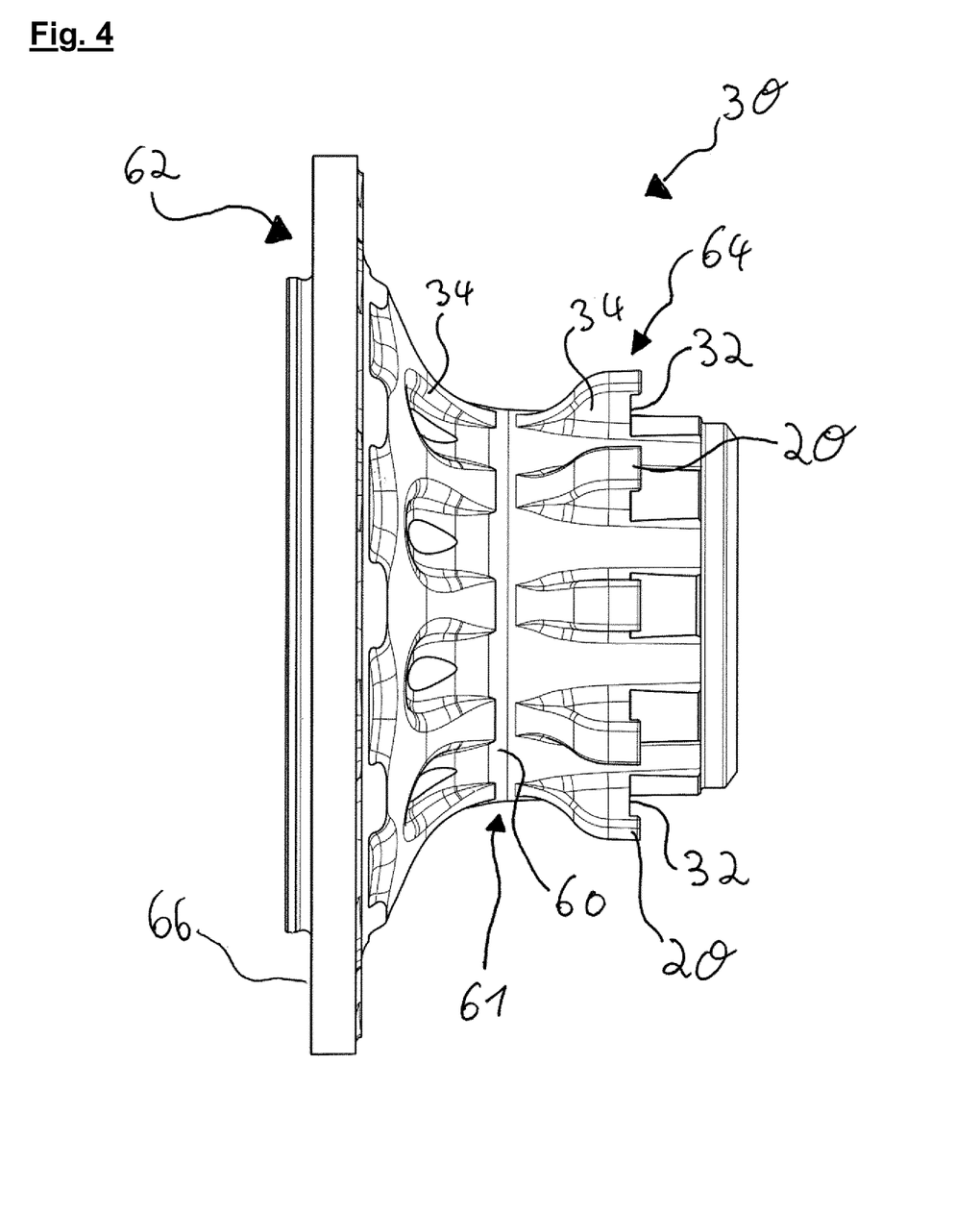
FIG. 4 is an external view of a hub.

FIG. 4 shows a hub 30. This hub 30 has a brake disc connection portion 64, an intermediate portion 61 and a cantilever portion 62. The intermediate portion 61 is arranged in the direction of the axis of rotation between the brake disc connection portion 64 and the cantilever portion 62 and connects these two portions with each other. The cantilever portion 62 has a wheel contact surface 66 whose outward normal faces away from the brake disc connection portion 64 and is parallel to the axis of rotation A. The hub 30 has rib elements 34 in the cantilever portion 62, but these rib elements 34 do not extend beyond the intermediate portion 61. In an imaginary extension to the ribs 34 arranged in the cantilever portion 62, however, a rib 34 also extends in each case in the brake disc connection portion 64. These ribs 34 in the brake disc connection portion 64 each form a connection surface 32, which are each bounded outwards in the radial direction R by a centring projection 20.

Figure 5:
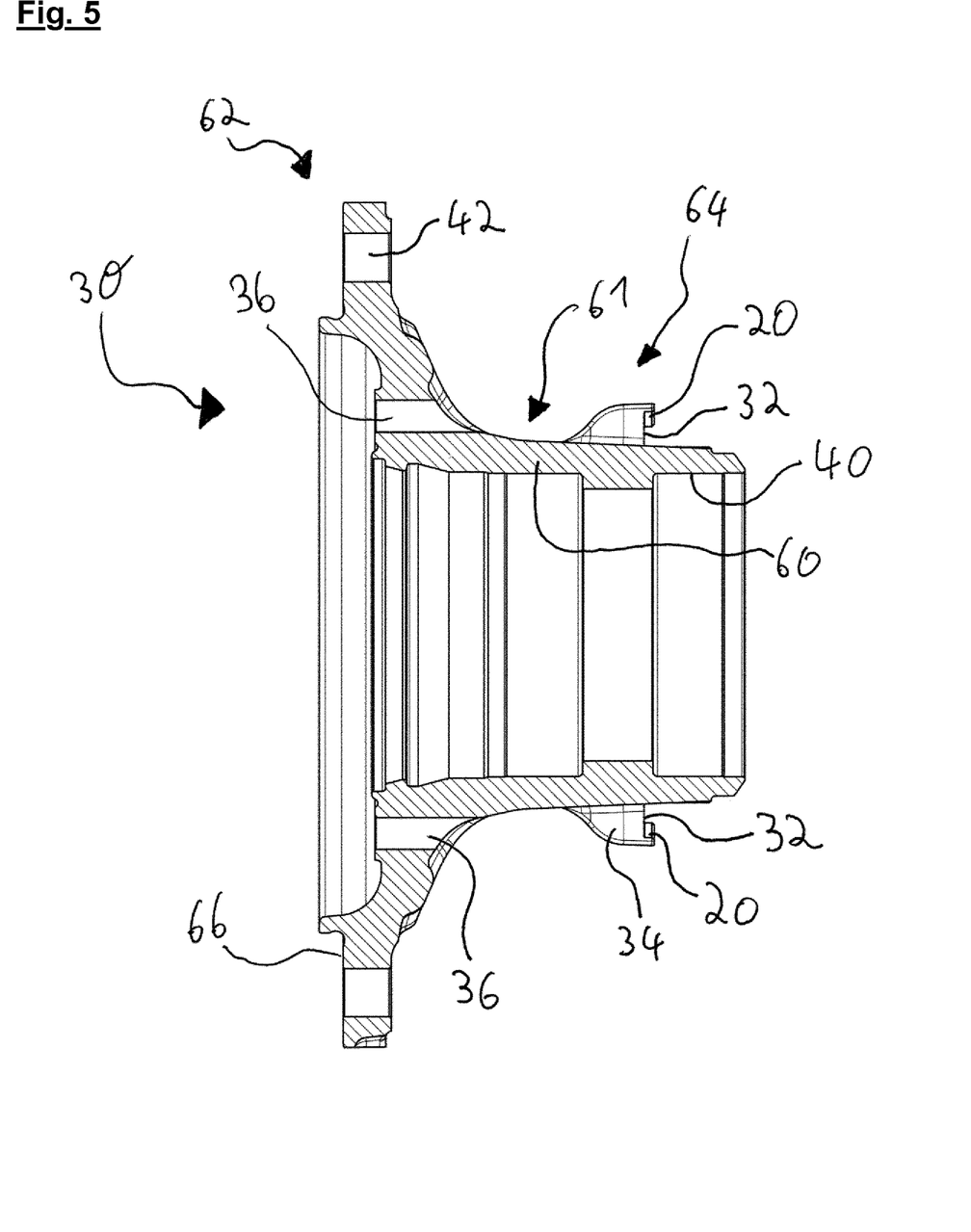
FIG. 5 is a section through a hub.

FIG. 5 shows a sectional view of a hub 30, which in principle can match the embodiment shown in FIG. 4. As can be seen in FIG. 5, the connection openings 36 extend completely through the cantilever portion 62 of the hub 30. In addition to these connection openings 36, the cantilever portion 62 also has wheel bolt receptacles 42, wherein the direction of extension of the wheel bolt receptacles 42 is parallel to the direction of extension of the connection openings 36. In addition to the cantilever portion 62, the hub 30 also has an intermediate portion 61 and a brake disc connection portion 64. The intermediate portion 61 is formed entirely by the cantilever portion 60, from which the cantilever portion 62 and the brake disc connection portion 64 each extend. The brake disc connection portion 64 is not formed continuously as seen in the circumferential direction U, but is formed in each case by individual ribs 34 which extend in the radial direction from the core portion 60. The core portion 60 forms at least one wheel contact surface 66.

LIST OF REFERENCE SIGNS

1—brake disc arrangement
10—brake disc
12—contact surface
14—mounting surface
16—mounting opening
20—centring projection
30—hub
32—connection surface
34—rib
36—connection opening
40—bearing contact surface
42—wheel bolt receptacle
50—connection means
60—core portion
61—intermediate portion
62—cantilever portion
64—brake disc connection portion
66—wheel contact surface A—axis of rotation
U—circumferential direction
R—radial direction

The invention claimed is:

1. A brake disc arrangement, comprising
a brake disc configured to rotate about an axis of rotation in a circumferential direction, the brake disc having a contact surface and a mounting surface;
a hub having a connection surface and a connection opening; and
at least one connector;
wherein a mounting opening extends from the mounting surface;
wherein the contact surface is configured to indirectly or directly contact the connection surface of the hub;
wherein the connector is configured to extend at least partially in the mounting opening and the connection opening; and
wherein the mounting surface is free of hub contact.

2. The brake disc arrangement according to claim 1, wherein the hub comprises a core portion, a cantilever portion and a brake disc connection portion, the cantilever portion and the brake disc connection portion extend radially in a radial direction from the core portion, the cantilever portion comprises a wheel contact surface and at least one connection opening, and wherein the brake disc connection portion comprises at least one contact surface.

3. The brake disc arrangement according to claim 2, wherein the core portion includes an intermediate portion which lies in a direction of the axis of rotation between the cantilever portion and the brake disc connection portion, and wherein the intermediate portion does not include ribs.

4. The brake disc arrangement according to claim 3, wherein the intermediate portion has a more tapered outer geometry compared to the cantilever portion and/or compared to the brake disc connection portion.

5. The brake disc arrangement according to claim 1, wherein a ratio of a mean distance of the contact surface from the axis of rotation to a mean distance of the mounting opening from the axis of rotation is in a range of 0.6 to 1.5.

6. The back disc arrangement of claim 5, wherein the range is 0.8 to 1.2.

7. The back disc arrangement of claim 6, wherein the range is 0.9 to 1.1.

8. The brake disc arrangement according to claim 1, wherein a ratio of a maximum extension of the brake disc in a direction of the axis of rotation to a maximum extension of the hub in the direction of the axis of rotation is in a range of 0.07 to 0.5.

9. The brake disc arrangement of claim 8, wherein the range is 0.1 to 0.3.

10. The brake disc arrangement of claim 9, wherein the range is 0.15 to 0.25.

11. The brake disc arrangement according to claim 1, wherein a ratio of a maximum extension of the connector to a maximum extension of the hub in a direction of the axis of rotation is in a range of 0.3 to 1.1.

12. The brake disc arrangement of claim 11, wherein the range is 0.5 to 0.95.

13. The brake disc arrangement of claim 12, wherein the range is 0.7 to 0.85.

14. The brake disc arrangement according to claim 1, wherein the brake disc has projections projecting in a direction of the axis of rotation and/or in a radial direction, at least one mounting surface forms a part of a projection, and wherein the mounting surface forms an edging end face for the projection in the direction of the axis of rotation.

15. The brake disc arrangement according to claim 14, wherein the projections are engageable with a complementary toothing of the hub.

16. The brake disc arrangement according to claim 1, wherein the brake disc and the hub are configured to be torquingly connected via a polygonal connection.

17. The brake disc arrangement according to claim 16, wherein a toothing of the brake disc has a play in the circumferential direction relative to a toothing of the hub of between 0.1 mm and 2 mm, and/or wherein the polygon connection has a play in the circumferential direction, in particular between 0.1 mm and 2 mm.

18. The brake disc arrangement according to claim 1, wherein the hub is one piece.

19. The brake disc arrangement according to claim 1, wherein the intermediate portion, in at least one cutting plane the normal of which is parallel to the axis of rotation, forms a cross-section which has a circular outer contour around the axis of rotation.

20. The brake disc arrangement according to claim 1, wherein the hub has ribs which preferably run in a direction of a radial direction and/or in a direction of the axis of rotation, at least one connection surface forms part of a respective rib, and wherein the ribs extend only in the brake disc connection portion.

21. The brake disc arrangement according to claim 1, wherein the hub has a wheel bolt receptacle in the cantilever portion.

22. The brake disc arrangement according to claim 1, wherein at least one connection opening, completely penetrates the cantilever portion of the hub.

23. The brake disc arrangement according to claim 1, wherein the hub has air ducts which extend in a direction of the axis of rotation.

24. The brake disc arrangement according to claim 1, wherein the hub has at least one bearing contact surface, for a wheel bearing, and wherein the core portion includes the at least one bearing contact surface.

25. The brake disc arrangement according to claim 1, wherein the at least one bearing contact surface includes at least two bearing contact surfaces.

26. The brake disc arrangement according to claim 1, wherein the hub has at least one centering projection, and wherein the at least one centering projection delimits a connection surface in an outward direction of a radial direction.

27. The brake disc arrangement according to claim 1, wherein the hub has a plurality of connection surfaces, and wherein each of the connection surfaces is bounded in an outward direction of a radial direction by a centering projection.

28. The brake disc arrangement according to claim 1, wherein the contact surface is one of a plurality of contact surfaces, and wherein the mounting surfaces is one of a plurality of mounting surfaces, and wherein the plurality of contact surfaces and the plurality of mounting surfaces are arranged alternately in the circumferential direction.

29. The brake disc arrangement according to claim 1, wherein the mounting opening is one of a plurality of mounting openings, and wherein a distance of each of the mounting openings from the axis of rotation is greater than a mean distance of the contact surface from the axis of rotation.

30. The brake disc arrangement according to claim 1, wherein the contact surface and/or the connection surface has/have an averaged normal substantially parallel to a direction of extension of the connector and/or to the axis of rotation.

31. The brake disc arrangement according to claim 1, wherein the mounting opening completely penetrates the brake disc.

32. The brake disc arrangement according to claim 1, wherein the brake disc is bent and/or V-shaped and/or shielded in a direction of a radial direction, at least in a non-assembled state, away from the wheel hub.

33. The brake disc arrangement according to claim 1, wherein the brake disc is transversely ventilated.

* * * * *

UNITED STATES PATENT AND TRADEMARK OFFICE
CERTIFICATE OF CORRECTION

| | |
|---|---|
| PATENT NO. | : 11,999,189 B2 |
| APPLICATION NO. | : 17/291877 |
| DATED | : June 4, 2024 |
| INVENTOR(S) | : Mark Hartmann |

It is certified that error appears in the above-identified patent and that said Letters Patent is hereby corrected as shown below:

In the Specification

Column 5, Lines 25, 26, 27, 30, 32, 40:
"centring" should be — centering —

Column 8, Line 10:
"centring" should be — centering —

Column 10, Line 10 (2x):
"centring" should be — centering —

Column 10, Line 11:
"centred" should be — centered —

Column 12, Lines 5, 6:
"centring" should be — centering —

Column 12, Lines 28, 55:
"centring" should be — centering —

Column 12, Line 40:
"60" should be — 62 —

In the Claims

Column 13, Claim 1, Line 5:
After "comprising" insert — : —

Column 14, Claim 22, Line 31:
Delete ","

Signed and Sealed this
Twenty-ninth Day of October, 2024

Katherine Kelly Vidal
*Director of the United States Patent and Trademark Office*